(12) United States Patent
Kochian

(10) Patent No.: US 6,278,976 B1
(45) Date of Patent: Aug. 21, 2001

(54) SYSTEM FOR THE DELIVERY OF AUDIO RECORDINGS

(75) Inventor: Michael Charles Kochian, 511 N. Mc Bride St., Syracuse, NY (US) 13203

(73) Assignee: Michael Charles Kochian, Syracuse, NY (US)

(*) Notice: Subject to any disclaimer, the term of this patent is extended or adjusted under 35 U.S.C. 154(b) by 0 days.

(21) Appl. No.: 09/534,754

(22) Filed: Mar. 24, 2000

Related U.S. Application Data

(60) Provisional application No. 60/126,024, filed on Mar. 25, 1999.

(51) Int. Cl.[7] ............... G10L 21/00; G10L 21/04; H04M 1/26; H04M 15/00
(52) U.S. Cl. ............ 704/500; 704/275; 704/201; 379/67.1; 379/87; 379/88.25; 379/88.22; 379/101.01; 379/126
(58) Field of Search ................ 704/500, 503, 704/220, 201

(56) References Cited

U.S. PATENT DOCUMENTS

| | | | |
|---|---|---|---|
| 5,191,410 | * | 3/1993 | McCalley ............... 348/13 |
| 5,511,000 | * | 4/1996 | Kaloi et al. ............ 704/278 |
| 5,541,638 | * | 7/1996 | Story ..................... 348/7 |
| 5,572,442 | * | 11/1996 | Schulhof et al. ......... 348/7 |
| 5,654,747 | * | 8/1997 | Ottesen et al. ......... 348/10 |
| 5,790,423 | * | 8/1998 | Lau et al. ............. 348/10 |
| 5,841,979 | * | 11/1998 | Schulhof et al. ....... 704/503 |
| 5,990,927 | * | 11/1999 | Hendricks et al. ...... 348/10 |
| 5,996,022 | * | 11/1999 | Krueger et al. ........ 704/503 |
| 6,002,394 | * | 1/2000 | Schein et al. ......... 348/731 |
| 6,081,780 | * | 6/2000 | Lumelsky .............. 704/275 |
| 6,088,722 | * | 7/2000 | Herz et al. ............. 348/1 |
| 6,122,617 | * | 9/2000 | Tjaden ................ 704/270 |

OTHER PUBLICATIONS

X–10 (X–10 (USA) Inc. Owner's Manual© 1986, 1987, 1988).*
Serial Communication Overview ("The PC Technology Guide", Webopedia©, The Internet.Com Corp.).*

* cited by examiner

*Primary Examiner*—Richemond Dorvil
*Assistant Examiner*—Daniel A. Nolan
(74) *Attorney, Agent, or Firm*—Bernhard P. Molldrem, Jr.

(57) ABSTRACT

Audio information is distributed from a service center to a large group of subscribers on a regular basis, depending on the desires of the individual subscribers. The audio information can be educational, recreational, or informational in nature. The service center stores user profile information, stores compressed audio recordings for future delivery, transmits compressed audio information to each base unit, and interfaces with subscribers. The base unit provides readiness status to the service center. The service center sends compressed digital audio information to the base station, after which the base station receives the compressed audio unattended, and automatically decodes and records the audio information on a cassette or other recording device. Communication between the service center and each base unit may use a data network that operates on top of the Public Switched Telephone Network using xDSL modems or a cable network using cable modems. The system maximizes efficient use of system resources and reduces total system costs.

20 Claims, 7 Drawing Sheets

SYSTEM FOR THE DELIVERY OF AUDIO RECORDINGS

CROSS REFERENCE TO RELATED APPLICATIONS

This application claims priority of U.S. provisional Appln. No. 60/126,024 filed Mar. 25$^{th}$, 1999 and disclosure document number 452,440, Mar. 9$^{th}$, 1999.

BACKGROUND OF THE INVENTION

The present invention relates generally to audio transmission, receiving, and playback systems, and is more specifically directed to a system that automatically disseminates user-preferred audio recordings from a service center to a receiving unit at the user's location, and wherein the receiving unit uses a standard recording recorder or recorder/player to record the audio information onto a medium from which it can be played back, such as audio cassette tape.

Change lies at the heart of innovation. Our world, the way we view it, and the way we live changes daily. The advent of high speed communications technology such as Asymmetric Digital Subscriber Line (ADSL) over standard residential-grade Public Switched Telephone Network (PSTN) wires and cable modems for use over CAble TeleVision or Community Antenna TeleVision (CATV) networks has opened the door to a host of new and exciting possibilities for everyday people. By providing a high-speed data link directly to the consumer's home, these technologies promise to deliver a whole host of new services. Further, the recent ruling by the FCC regarding line-sharing helps to ensure that high speed data links will be available to everyone, not just a privileged few. In the days to come, when every household has a data link with One Megabit per second throughput, or more, the norms we have become familiar with today will be challenged. Just as people's idea of entertainment changed with the development of broadcasting technology, from radio to television, so too will people's idea of information gathering and retrieval change. We will watch as the things around us evolve into something perhaps not completely different, but into something new. However, to depart from the present wisdom of our financial world, we should not assume the obvious. The presence of inexpensive, high-speed data links into the home does not guarantee that every household in society will instantly have an overwhelming desire to connect to the Internet. Nor should we assume that every home can afford the expense associated with owning a personal computer. There are many potential uses of high-speed data links into the home, literally a world of future possibilities. Digital subscriber lines (DSL) and cable modems are technologies that enable the value-added tools of the future. Some of these tools do not require a personal computer in order to yield benefits to society from the communications revolution. If used correctly high-speed data links into the home have tremendous potential not just in the field of the Internet, but in the field of audio transmission, receiving, and playback systems.

People have a need for information. To satisfy this need people read books, listen to the radio, or watch television. For example, parishioners who attend a local church do so because they have a need to learn more about God. Traditionally the way to absorb information from a local church is to attend the regularly scheduled church meetings. In these meetings the Pastor of the church gives a sermon. Some sermons are dull, meandering speeches that delve into personal details about the Pastor's life that no one wants to hear. Other sermons detail the miracles, works of God, teaching, and aftermath of the wondrous life of Jesus Christ, a testimony to people everywhere. In a more modern church the way people absorb information can be by attending the church service, by going to a classroom teaching on a specific religious topic, or by listening to an audio cassette tape that contains a prerecorded message. All of these options involve a considerable time investment on the part of the parishioner, but time is the one thing that people in today's society do not have enough of. The parishioner must spend the time to drive to church and listen to the service. Likewise for a class, the parishioner must spend the time to drive to church and listen to the teacher. If the parishioner buys an audio cassette he/she must wait in line, order, and perhaps wait again for the order to be filled. Some would say that this is time well spent. Others would argue that there is a better way for people to get the information they want quickly, more easily, and without spending time unnecessarily. What if just the information content that would normally be placed on an audio tape could be sent directly to the person's home, in a similar fashion to the way mail is delivered to the person's mailbox? What if this could be done cheaply, making use of high-speed data links, without the requirement that the user own a personal computer?

The present invention provides a better way to deliver customized audio information to the people who live in today's world. A world where people do not have the time to learn how to play with complicated contraptions. A world where people need and want affordable technology that makes life easier and that saves time. A world populated by everyday people who do not own a personal computer and can't afford to spend three-hundred dollars on the latest high-tech toy that will be outdated or forgotten about four months from now. The present invention provides a way to send information directly to the user's home where it will be recorded onto standard magnetic audio cassette tape, or an equivalent medium that is widely used and widely available, for future use by the user at a time and place of the user's own choosing.

Previous inventions focused on the delivery of video and audio such that the delivery of audio information was treated like an afterthought. The art detailed in the patents disclosed by Yurt et al., U.S. Pat. Nos. 5,132,992, 5,253,275, and U.S. Pat. No. 5,550,863, do an excellent job of detailing practical transmission and reception systems. However the patents describe distribution systems that rely on the user to interactively make direct selections from the library of available audio recording. Audio recordings are not distributed automatically to the user, increasing the amount of time and effort put forth by a user in order to receive information. In addition, the system is not designed for mass distribution to a potentially large population of users, no mention is made of resource conservation on either the transmitting side or the receiving side of the system.

Schulhof et al., U.S. Pat. No. 5841979, discloses a system that automatically downloads audio recordings to a form of portable storage media. The receiving system is not capable of interfacing with a standard recording device. It cannot automatically download audio recordings to standard audio cassette tape.

The inventions disclosed by Satoh U.S. Pat. No. 5,055,947 and Eisele U.S. Pat. No. 5,159,182 detail the use of specialized devices designed to fit inside the body of a normal audio cassette tape. Lau et al. U.S. Pat. No. 5,790,423, details an ingenious system where the cassette can interface with a standard magnetic tape playback device. However these inventions ignore one of the greatest attributes of audio cassette recorders, namely, their use of standard off-the-shelf audio cassette tapes. The popularity of audio cassette recorders has given rise to widespread use of audio cassette tapes. These tapes are available everywhere, from supermarkets to local convenience stores. Their widespread use not only makes audio cassette tapes widely available, but quite affordable. The inventions mentioned above do not use ordinary audio cassette tapes.

VanLeeuwen U.S. Pat. No. 5,654,747 and Hendricks U.S. Pat. No. 5,990,927 describe inventions that can generate electromagnetic control signals in order to control a standard VCR. This is similar to one of the alternative embodiments of the present invention. However the focus in the art mentioned above is on the control of a VCR, a device designed to present video primarily. The material does not address the need to control standard audio recording devices. In addition, the inventions do not address the issue of controlling standard recording devices that do not make use of an electromagnetic controller.

When one considers the history of audio transmission, receiving, and playback systems one can think of a number of systems that are capable of transmitting audio and or video recordings to remote locations. U.S. Pat. No. 4,829,372 and U.S. Pat. No. 5,191,410 issued to McCalley et al. describe systems of this type. U.S. Pat. No. 5,874,986 and U.S. Pat. No. 5,440,336 issued to Gibbon et al. and Buhro et al., respectively, also relate to similar systems. These approaches usually combine video data with audio data so that the video requirements dictate the complexity of the receiving system, the size of the receiver's storage capacity, and the breadth of the information distribution. In addition many of these systems require that users interactively download information from a central library, and thereby make the assumption that users have the time to engage in this type of activity. Few address the need to download audio recordings onto cassette tapes, a storage media widely used, available, and familiar to everyday people. None automatically download audio recordings to standard audio cassette tape using a standard recording device. None are intended to deliver audio information to a large user base on a regular, repetitive basis.

What is needed is a system that can 1) distribute customized information to a wide base of users making full use of system resources and thereby lowering the cost of the system, 2) transmit audio recordings at a fraction of their normal audible playback time, 3) transmit and receive messages at times which are advantageous to both the sender and recipient, and 4) automatically deliver the audio recordings, with minimal user interaction, onto media that is widely used and available.

Other approaches relevant to this concept are discussed, for example, in RFC 793 *Transmission Control Protocol.* J. Postel. 9/1/89; RFC 1095 *Common Management Information Services and Protocol over TCP/IP.* U.S. Warrier, L. Besaw. Sep. 1, 1989; and RFC 1157 *Simple Network Management Protocol.* J. D. Case, M. Fedor, M. L. Schoffstall, C. Davin May 1, 1990

SUMMARY OF THE INVENTION

The present invention includes a system and method for the delivery of audio information to a large group of subscribers on a regular basis. The audio information can be educational, recreational, or informational in nature. The system consists of a service center, a base unit, and a standard magnetic tape audio recording device. Each base unit is designed to be installed on the user's premises, thus one service center delivers audio information to a plurality of base units. The service center stores user profile information, stores compressed audio recordings for future delivery, transmits compressed audio information to each base unit, and acts as an interface for users. The base unit provides status information to the service center, receives service center transmissions, stores the compressed audio information contained in the transmissions, and delivers the audio information to a standard recording device in real-time. The base unit delivers the audio information by taking control of a standard recording device connected to the base unit, and by delivering an audio signal to the standard recording device that is a real-time analog audio input signal. The real-time signal is input to the standard recording device where it is recorded onto a standard magnetic tape audio cassette. These cassettes are widely used and commonly available to everyday people. A control method is described that is performed by the base unit to exert control over the recording device. Communication between the service center and each base unit is done over a data network that operates on top of the Public Switched Telephone Network using xDSL modems or a cable network using cable modems. The distribution of audio information from the service center to each base unit is done in a manner that maximizes the efficient use of system resources in an effort to reduce the cost of the system. A distribution method is described that accomplishes this goal through the use of network management tools and logic.

It is an advantage of the present invention that it brings the fruits of today's modem technology, namely tailored information, to everyday people in an affordable fashion, without the need for each person to own personal computer.

It is an advantage of the present invention to provide a system that delivers user-preferred audio recordings to users in a manner that minimizes user interaction with the delivery system. Transmission of user-preferred audio recording from the service center to the base unit is done automatically, without the need for regular user interaction.

It is an advantage of the present invention that it provides users with a delivery system that can deliver audio recordings onto standard audio cassette tapes in a cost-effective manner. Audio cassette tapes are widely used and available to consumers today. The ubiquity of audio cassette tape players in cars, stereo systems, and portable players, makes playback of the delivered information easy and convenient.

It is an advantage of the present invention that it provides users with a delivery system that maximizes the use of resources. Resources owned by the users of the system, and system resources. The invention makes use of resources already owned and available to users such as a telephone, an audio cassette recorder, and standard off-the-shelf audio cassettes. Likewise the invention maximizes the number of users that can be served by a single service center by making use of the latest information technology available.

It is an advantage of the present invention that it provides a means whereby a standard magnetic tape audio cassette recorder can be used as a receiving device for audio recordings distributed by the system. This creates a new use for an existing technology.

DETAILED DESCRIPTION OF THE PREFERRED EMBODIMENTS

Figure 1:
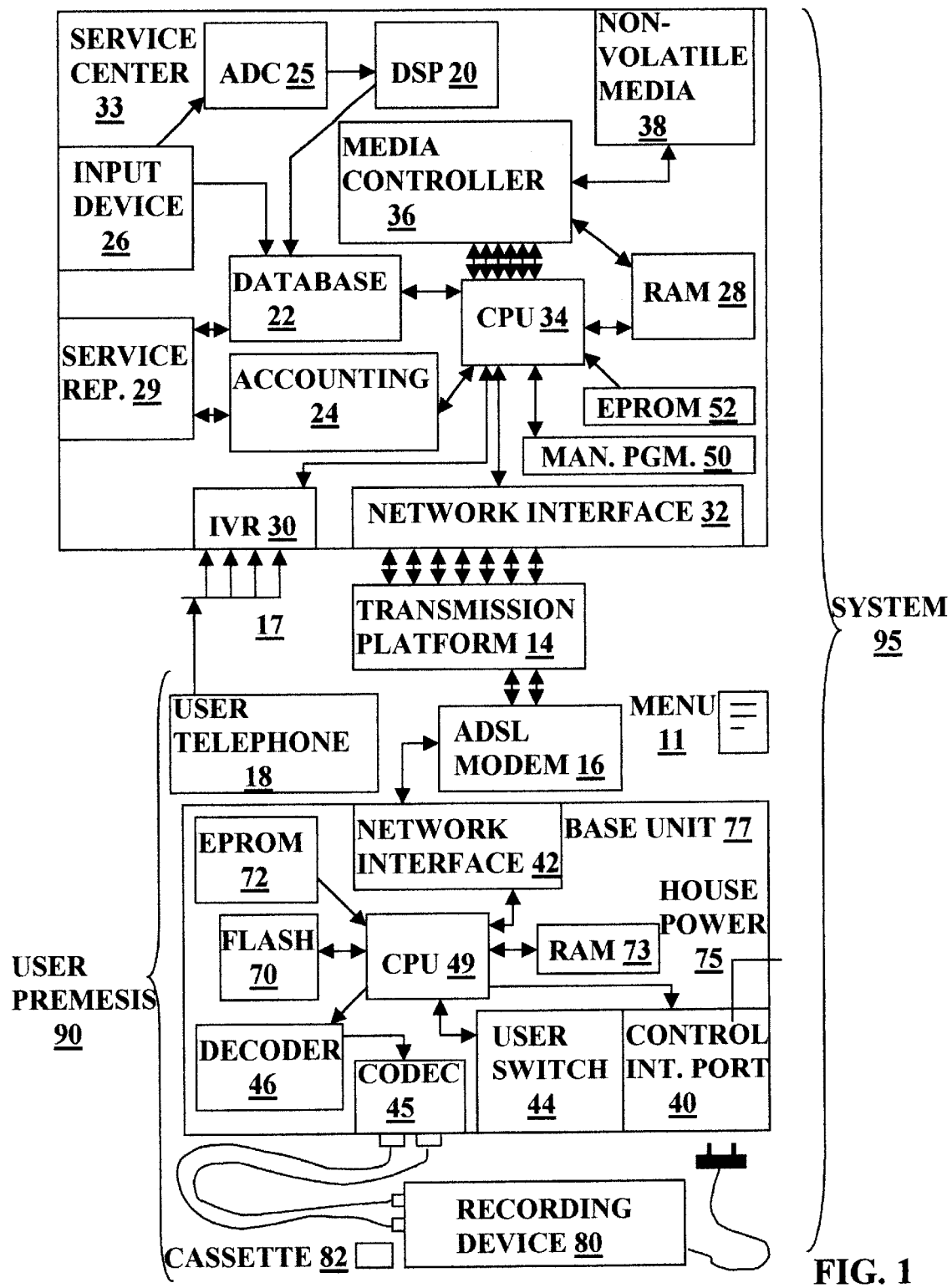
FIG. 1 is a schematic diagram of the service center and one of the multiple subscriber base units of the present invention, with standard recording device.
Figure 5:
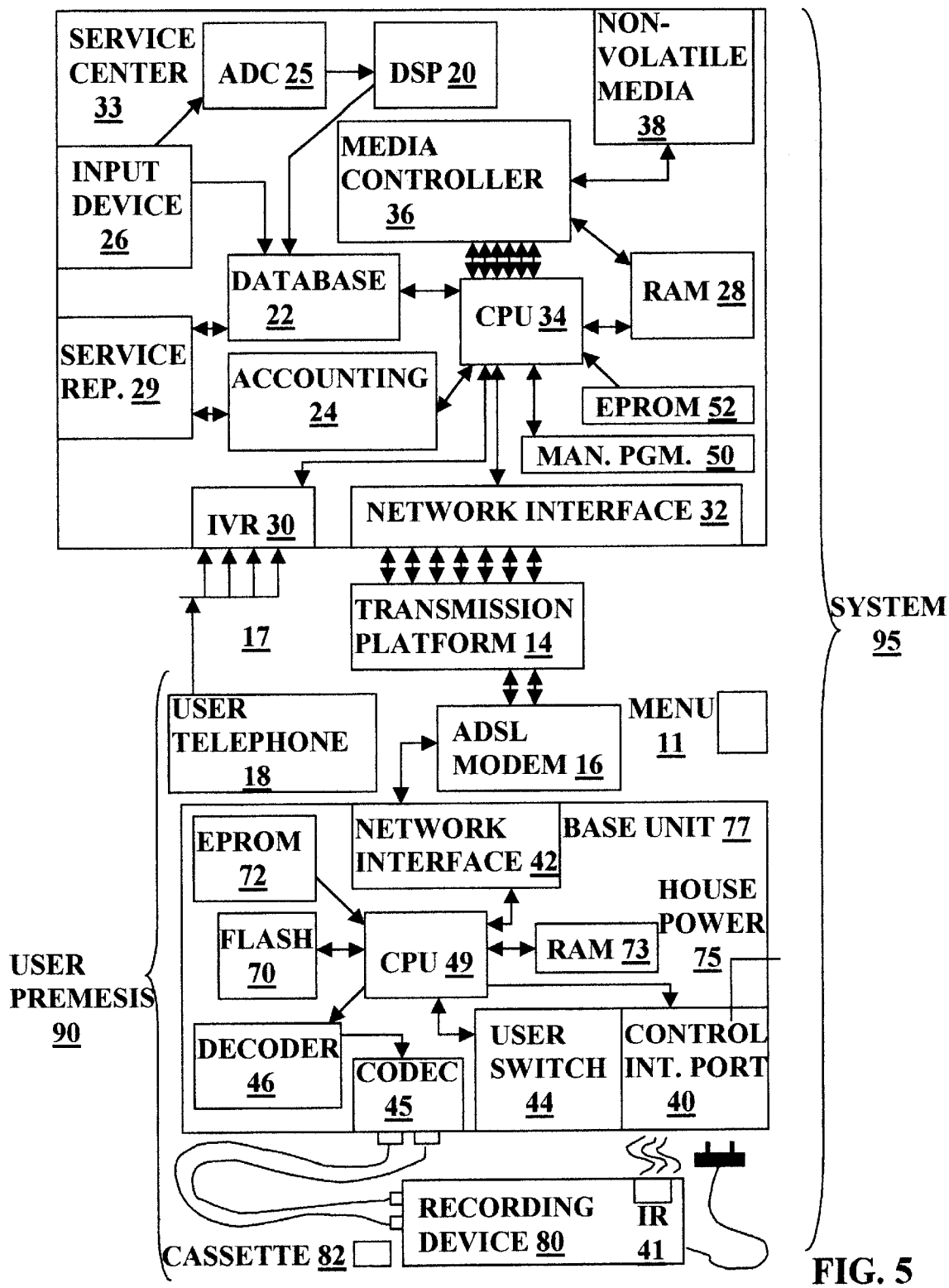
FIG. 5 is a schematic diagram of a second embodiment of the invention: a base unit that controls a standard recording device by transmitting an electromagnetic wave control signal.
Figure 6:
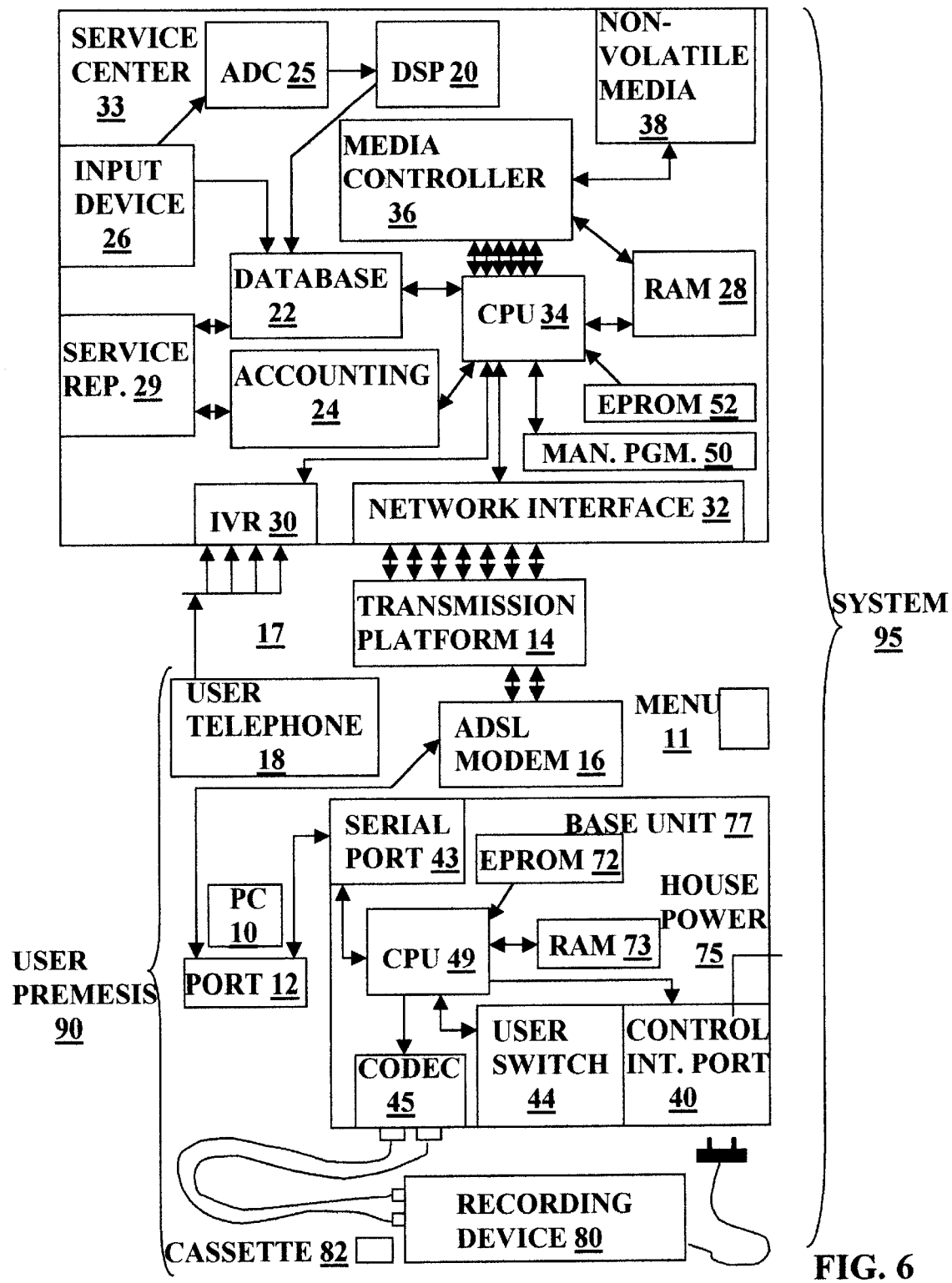
FIG. 6 is a schematic diagram of a third embodiment of the invention: a base unit that works in cooperation with a personal computer, making use of the computer's resources to perform some of the work involved with downloading and processing an audio message from the service center.
Figure 7:
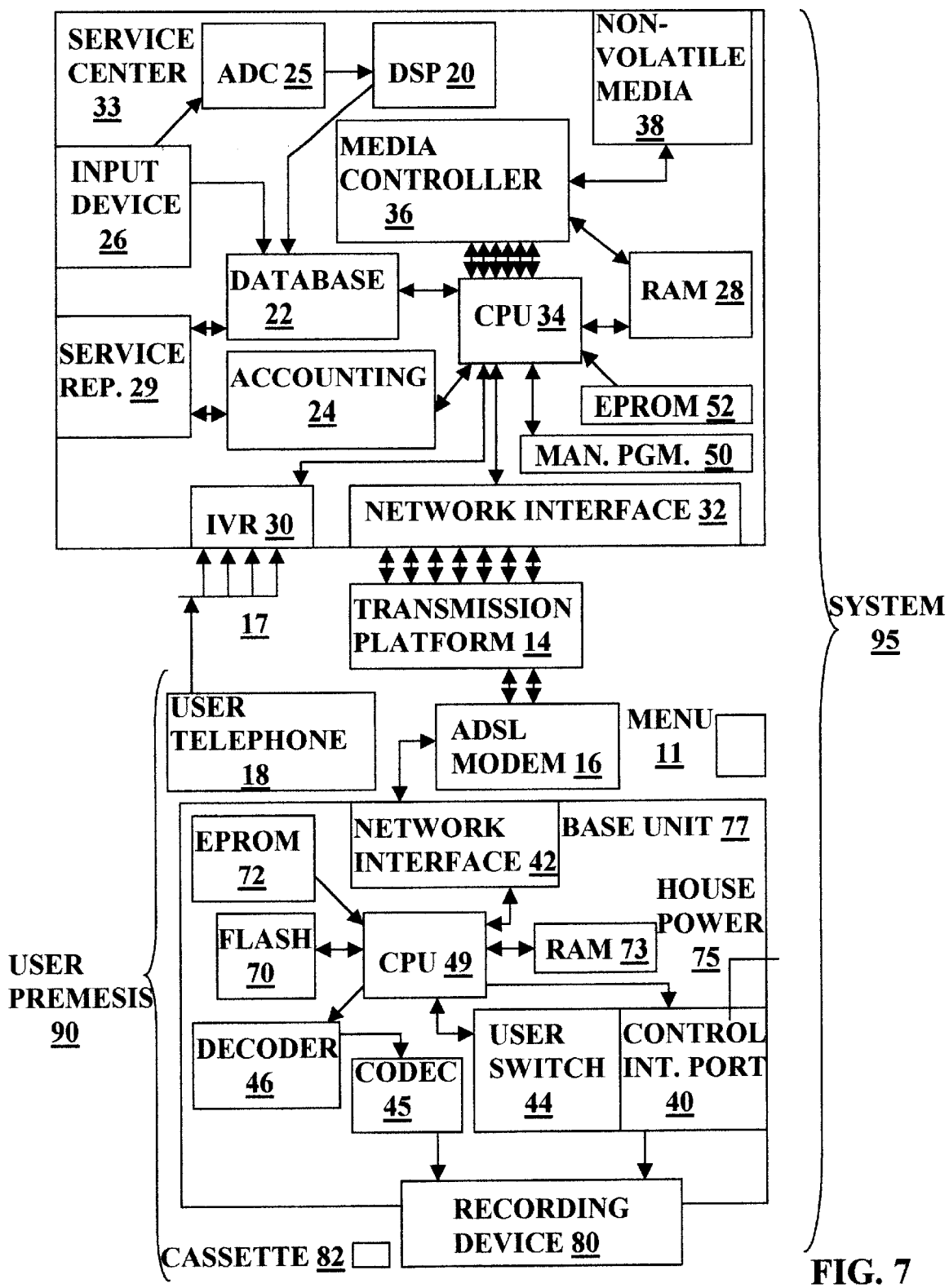
FIG. 7 is a schematic diagram of a fourth embodiment of the invention: a base unit that has a standard magnetic tape recording device built into it.

FIG. 1 presents a schematic diagram of the an embodiment of a system 95 according to the present invention. The system 95 of this invention is a delivery system that is composed of three major components: a service center 33, and a multitude of subscriber base units (here one base unit 77 is shown), that each interface with a user-owned and supplied recording device 80. The service center 33 functions as a centralized data repository and distribution point. It contains data storage in the form of non-volatile media 38 that holds user profile data and a compressed library of audibly expressed recordings for distribution to users, as well as a centralized means of communication in the form of a network interface 32 to contact user base units 77. The communications platform 14 of the preferred embodiment, the portion of the system that is used for communications between the base unit 77 and the service center 33, is the Public Switched Telephone Network (PSTN) and the means of communication is an Asynchronous Digital Subscriber Line (ADSL) modem 16. The ADSL modem 16 serves to connect each subscriber base unit 77 with the service center 33 over a data network provided by the local network service provider. However the system is designed to accommodate a variety of communication means and can use any device capable of interfacing with the base unit 77 via an IEEE 802.3 data interface. Some examples include a cable modem for use on a CAble TeleVision (CATV) network transmission platform or a wireless technology such as digital PCS. The base unit 77 connects to a standard, user-supplied, magnetic audio tape recording device 80 and delivers audio information and entertainment to the recording device 80 where it is recorded to a standard audio cassette tape 82 under the control of the base unit 77. FIG. 5 is a diagram of a base unit 77 for use with a recording device 80 that has an infrared or other electromagnetic wave remote controller. FIG. 6 depicts the subject invention for use with a desktop computer system for those users who own a desktop computer and wish to use it. Finally FIG. 7 depicts a base unit with an integral recording device for use by users who do not own a recording device that is suitable for interface with the base unit 77. The main components of the system will now be described in detail.

The system 95 delivers audio information in a unidirectional manner, from the service center 33 to the user base unit 77, and delivery is always initiated by the service center 33 under a fixed time schedule that is configured by the user. The delivery schedule is stored as part of the user's profile which is kept on the non-volatile data storage media 38 and can be altered by users at any time. Alteration of the delivery schedule can be accomplished by individual users through a plurality of PSTN telephone lines 17 connected to an Interactive Voice Response (IVR) unit 30. The IVR acts as an interface for the user through which the user can modify personal profile data stored by the database 22, add to existing personal profile data, speak to a customer service representative 29, or modify the delivery service by simply entering commands from his/her telephone keypad 18. It is intended that the service center interface for users be simple and convenient. To accomplish this a number of different means besides an WR unit may be employed, including a web page hosted by the service center CPU resource 34 for access by users over the Internet. Besides personal profile information, the service center 33 also stores compressed audio recordings on the non-volatile storage media 38. The audio recordings and the user profile information are stored in an identifiable fashion, under the control of the database software 22, and executed by the media controller 36. The recordings are accessed by the CPU resources 34, under the direction of a control program stored on non-volatile memory such as an EPROM 52, for distribution to user base units 77 as described below. Audibly expressive works such as music and voice recording are stored on the non-volatile data storage media 38 in a digital, compressed data format and input to the service center through the input device 26. Audio recordings that are input to the service center 33 as a first analog audio signal will be converted to a digital signal by the Analog to Digital Converter (ADC) 25 before being passed to the Digital Signal Processor or DSP 20. The DSP 20 will format the digital signal received from the ADC 25 and subsequently apply compression to the resulting digital data before passing the data to the database software 22 for storage. It is intended that the audio input device 26 be capable of inputting audio information to the service center 33 from the various forms that the information may be transmitted on. This includes previously recorded media such as an audio tape cassette, CD, or a digital audio tape, DAT, spontaneously recorded information such as that collected from a microphone, or previously formatted data which may be transmitted over a connection to the Internet or over a T-carrier service. The non-volatile storage media 38 of the service center 33 may take a variety of forms including a Redundant Array of Inexpensive Disks (RAID) array, a 4mm tape drive, computer hard disk drive, Bernoulli drive, external Syquest hard drive, recordable CD, or other form depending on current trends in digital data storage technology. The audio recording data stored on the non-volatile storage media 38 is periodically collected by the CPU 34, temporarily stored in volatile system memory 28, formatted, and transmitted to user base units via the network interface 32. The network interface 32 can be a single xDSL modem, a collection of xDSL modems, or a T-carrier to a network service provider, depending on the number of base units 77 that need to be served by a single service center 33. Before transmission begins the CPU 34, under the direction of the network management program 50, requests current status information from each base unit 77 (step 404, FIG. 4). Once this information is received from the base unit 77, the CPU 34 transmits the audio information to users who desire information and records the successful transmission via the accounting software 24 which operates on the service center CPU resources 34. The process by which the CPU 34 collects desired user information from the non-volatile media 38 and prepares to transmit will be discussed next.

Audio recordings input to the service center are stored on the non-volatile data storage media 38 in an addressable location that can be cross-referenced by a category description reference number. Category description reference numbers are comprised of two numbers, a general category number and an index number. Each general category heading provides a rough description of the content of the audio recordings stored under it, and is established by service center personnel 29 as a means to organize the repository of audio recordings stored on the non-volatile media 38. Every audio recording stored by the service center 33 has a unique index number. However many different audio recordings can have the same general category number depending on the content of the recordings. For example one recording stored by the service center 33 may specifically deal with the topic of subduing our own bodies as related by the Apostle Paul in (I Corinthians 9:26,27). Another recording may deal specifically with personal motives as related by the apostle Peter in (I Peter 2:1). Each of these recordings will receive a unique index number before storage, but both may be stored under the same general category number: the number corresponding to the topic of Discipline. All audibly expressive works entered into the service center 33 are categorized prior to storage and delivery. When service center personnel 29 input audio information they monitor the title of the information for indications regarding its general content. If the input audio recording is previously titled so that the content is clearly described, then the recording is fed into the service center and categorized according to its title. If the input audio recording has no title or has an ambiguous title then the content of the recording is monitored by the service center personnel 29 and is stored according to the category deemed appropriate by the service center personnel 29. Once the general content and category of the recording is determined, a general category number and an index number are assigned to the recording as a storage reference.

The general categories of the service center information repository residing on the data center's non-volatile data storage media 38 are published and distributed to users on a menu 11. The menu 11 serves the dual purpose of informing users of the audio information that is available for delivery, and acts as a guide for the user to set up his/her personal information profile as described below. Menus 11 are designed to illustrate the current categories of audio recording available to the user and are periodically revised to document additions/deletions to the list of available categories. A menu utilized for information of a religious nature for example might contain several general categories such as Sin, Lifestyles, Discipline, and Love. Within each general category there could be several sub-categories. The general Lifestyles category mentioned above could be broken down into sub-categores such as Worrying, Haughtiness, Anxiety, and Forgiveness. Within each sub-category there could be multiple audio messages, each message being referenced by a unique index number as described above. Menus can be printed and distributed to users by hand, listed audibly over the IVR 30, mailed to users, broadcast over a CATV network, or displayed on an Internet website. The menu is designed to change according to the desires of the user base. Should a user of the system 95 desire that a new category be established by the service center 33 he/she can indicate his/her desire through contact with service center personnel 29 or by returning a mail-in survey form. When a significant number of users signify their interest in a new category the service center category listing will be modified to include the new category and the selection of input audio recordings will be modified accordingly. Subsequent revisions of the menu 11 will show the new category and users will have the option of incorporating the new category into their user profile.

User profile information stored by the database software 22 includes the user's account number, Personal Identification Number (PIN), delivery preference, service activation field, and an information profile that lists user-preferred information categories and their relative importance to the user. Through the IVR 30 users select specific categories of interest which are listed on the menu 11. Users can do this by contacting the service center 33 directly from their telephone 18 by dialing the service center telephone number. Once connected the user is guided by the IVR 30 through a series of options that allow the user to enter profile information including preferred categories of interest and their relative importance to the user. For example a user who has already set up a profile on the service center database reads the latest menu revision and finds that the service center is now offering sermon/teaching excerpts regarding the general category Overcoming Anxiety: the Workplace. The user desires to hear information under this category but realizes that her profile currently lists Sin: What is It? as the prime category choice for delivery. She understands that she will not receive excerpts from the Anxiety category during the next delivery period unless she changes her profile. To do so she dials the service center telephone number and uses the IVR menu selections to modify her profile so that the Anxiety topic is now the primary category choice. In the future the service center CPU 34, after consulting her updated user profile, will select audio recordings from the Anxiety category first for delivery to her base unit 77. The user profile also includes a delivery preference. The delivery preference specifies which days of the week the user wishes to have audio delivery take place. Options include a Monday through Friday delivery or a Monday-Wednesday-Friday delivery. In addition to category and delivery preferences the user profile also contains a service activation field. This field is used by the user to activate or deactivate the delivery service. Deactivation of the delivery service will prevent the service center CPU 34 from creating a transmission message and originating a transmission session during the delivery period (step 401, FIG. 4) as described below. If necessary the user can also contact a service representative 29 by selecting the appropriate IVR menu item. Once a user profile is established the user no longer needs to contact the service center. Delivery of audio recordings from the service center to the user's base unit will proceed continuously according to the delivery preference indicated on the stored user profile. Daily contact with the service center is not necessary to initiate the delivery of information. Users only need to contact the service center to modify profile information, or alter their delivery preference. All user profile data is managed by the service center database software 22 which makes use of the non-volatile storage media 38 via the media controller 36 and the CPU 34. Stored user profile information is used as a guide by the service center CPU 34 for the delivery of audio recordings during the delivery period.

The delivery service of the service center 33 uses user profile information stored by the database unit 22 to deliver only user-preferred audio information to each user base unit 77. During each 24 hour day a specific time period, known as the delivery period, is set aside by the service center CPU 34 for delivery of user-preferred audio information. Prior to the delivery period the CPU 34 begins to compile a collection of compressed audio recording from the storage media 38 for each individual user who has profile information on the database 22 and who currently has an active service activation field stored on his/her user profile. This may include one or more items of audio information from the non-volatile storage media 38. The collection of audio information will be gathered by the CPU 34 and formatted for Transmission Control Protocol/Internet Protocol (TCP/IP) transmission over the communications platform 14 connected to the service center 33. The TCP/IP formatted collection of compressed audio information is referred to as a transmission message. The CPU 34 performs this function automatically by accessing the user profile information stored on the storage media 38 to determine which categories of information the user is interested in. The CPU 34 then begins to format the message that will be sent to the user base unit using its RAM 28. The CPU 34 selects one or more compressed audio recordings from the storage media 38 for delivery to the user. The audio recordings selected by the CPU 34 are recordings that have content categories that match or closely match the user-selected categories listed on the user profile database 22. The audio recordings are placed in sequence according to the user-preferred relative ranking of categories stored on the database 22 in order to form the information content of a complete transmission message. The CPU 34 checks the database 22 to ensure that no duplicate information is sent to the user. Once the transmission message is complete the CPU 34 queues the message for transmission (step 407, FIG. 4). Transmissions are only done during the delivery period as described below. In this manner the CPU 34 automatically compiles transmission messages for every active user on the database 22. Queued messages are stored in RAM 28 or on the non-volatile storage media 38 as the system requires until the delivery period is complete for that day.

Figure 4:
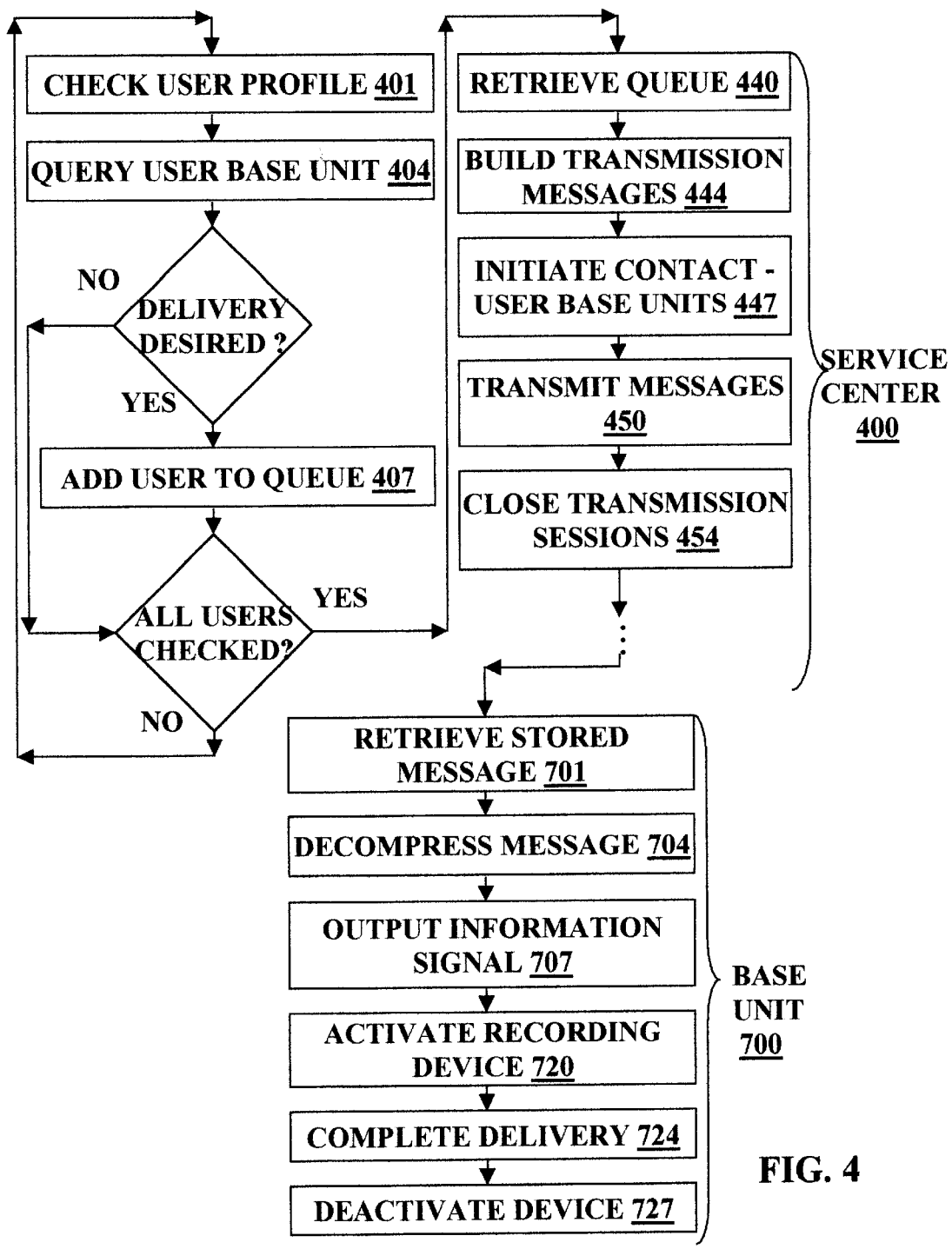
FIG. 4 is a flow diagram of the distribution method used by the service center to distribute audio information to each base unit connected to the service center.

In the preferred embodiment the service center CPU 34 schedules audio delivery to user base units 77 based on a 24 hour per day cycle. Each 24 hour cycle is sub-divided into a user response period and a delivery period. The user response period is the time when the service center 33 uses all of its available resources to perform routine operations. These operations include the input of audio information, interaction with users of the delivery service, user activation and deactivation of the delivery service, and system administration of service center 33 resources. As described above audio information is input to the service center 33 via the service center input means 26. Under control of the CPU 34 audio information is input to the service center 26, converted to digital format if necessary, compressed, and stored in the non-volatile media 38 under a database schema defined by the database software 22. The compression algorithm used by the service center may be MPEG, Dolby AC3, G-722 or some other algorithm capable of compressing digital audio effectively. Audio recordings that are input to the service center in first analog audio format will be converted to digital format by the conversion means 25 before being stored on the non-volatile storage media 38. It is intended that the audio input device take a variety of forms so as to provide for flexibility in reading audio information on the many various forms of recording media available today. Thus the audio input device 26 can take the form of an audio tape cassette deck, CD, a DAT, a microphone, a connection to the Internet, a T-carrier to an information service, or some other device capable of feeding audibly expressive works in analog or digital format to the conversion means 25. Another routine operation of the service center 33 is to interact with users of the service. Normally users interact with the service center 33 via the IVR 30 or the Internet web site maintained by the CPU resources 34. Using these interfaces, users can retrieve their own personal profile information from the database 22. Once retrieved, the user's profile information can be viewed, modified, or deleted in an interactive fashion by the user using commands entered from the user's PSTN telephone keypad 18. In the case of a web site interface operated by the service center CPU resources 34, commands are entered via a GUI interface. In addition some users may feel it necessary to contact a human service representative 29. To do this users simply dial the service center telephone number and enter a special set of numbers from their PSTN telephone keypad. The user's PSTN telephone line 17 is then routed through the IVR 30 to a human representative 29. The user response period is also the period of time during which users may choose to activate or deactivate delivery of audio messages by the service center 33. This is done in two ways. The first way a user may activate or deactivate delivery is to contact the service center 33 directly via the methods indicated above. Once the user establishes contact with the service center 33 he/she may deactivate or activate the delivery service by changing his/her stored user profile information to indicate that delivery is no longer desired. This will prevent the service center 33 from building a transmission message, as shown in step 401 of FIG. 4. The service activation status field stored in the user's profile in the database 22 is queried by the CPU resources 34 to determine if the user wants a delivery during the next delivery period. The second way a user may activate or deactivate the delivery service is by switching the base unit switch 44 to the on position to activate, or to the off position to deactivate. The position of this switch is monitored by the base unit's CPU resource 49 and is stored as status information in the base unit's nonvolatile memory 70. This information will be read by the service center's network management resources 50 to determine if delivery is desired (FIG.4, step 404). It is provided for the convenience of the user so that if a user does not wish to take the time to contact the service center 33 he/she may simply flip the switch 44 on his/her base unit 77 to indicate that delivery is not desired. The use of network management 50 also provides a way for the service center 33 to quickly determine exactly who does or does not desire to receive audio information. If a user does not wish to receive information during the cycle, no further processing is done on his/her behalf by the service center 33. Further details concerning the network management 50 portion of the service center follow in the next paragraph. Input and storage of audio information, and interaction with users of the service comprise the main functions that are accomplished during the user response portion of the service center 33 activity cycle. This portion of the normal service center 33 cycle is considered to be preparatory for the next period of the normal service center cycle, the delivery period.

The delivery period of each 24 hour cycle is the time period when the service center 33 devotes most of its resources to the delivery of transmission messages to user base units 77.

Figure 2:
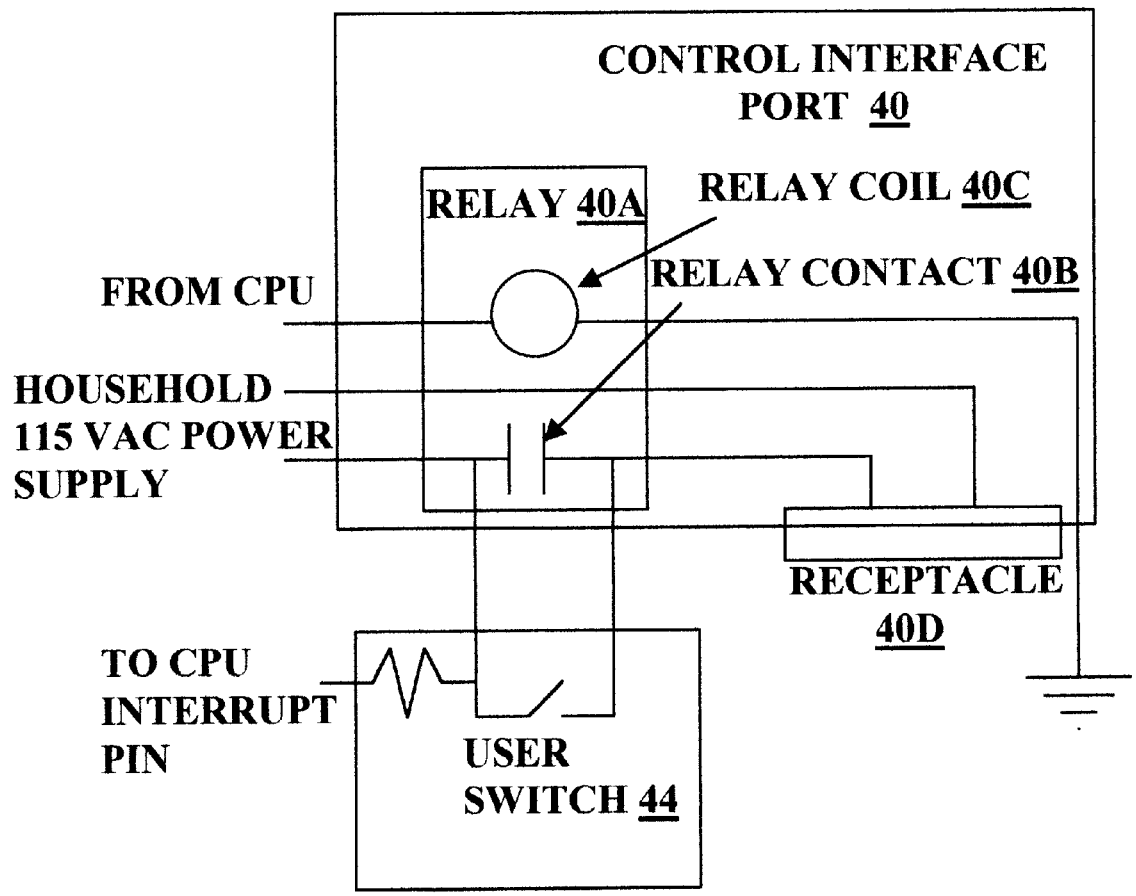
FIG. 2 is a detailed schematic diagram of working components contained in the control interface port and the user switch portions of the base unit.

When the delivery period begins the primary function of the service center CPU resource 34 is to coordinate the delivery of queued transmission messages (steps 440-454, FIG.4) to user base units 77 via the service center network interface 32. The CPU 34 begins the delivery period by referencing the user database 22 and checking the activation status field of each user record. A list of users, those who have a positive delivery indication in their user activation status field, is compiled by the CPU 34 (step 407, FIG. 4). Then the CPU 34, with the assistance of the network management resources 50, polls each user base unit 77 via the service center network interface 32. In the preferred embodiment the network management protocol is Simple Network Management Protocol (SNMP) and polling is accomplished when the CPU 34 originates an SNMP Get Request via the SNMP management program 50. However the protocol used for network management 50 can also be CMOT or some other reliable protocol operating on top of TCP. In a similar way that a message would be sent if the service center 33 and the base unit 77 were connected directly by an IEEE 802.3 LAN, the service center CPU 34 transmits the SNMP Get Request over the data network as a TCP/IP protocol Protocol Data Unit (PDU). The SNMP Get Request is received by the base unit 77 and processed by the SNMP agent that is part of the base unit control program stored in non-volatile memory 72. The means of communication over the PSTN 14 is an xDSL modem 16. The SNMP Get Request polls the user base unit 77 for information regarding the user's status information. In the preferred embodiment the user status information is limited to the activation status of the user switch 44. The base unit switch 44, in the preferred embodiment, is a two-position switch that indicates the status of the base unit 77 as either activated or deactivated by the user. Its current position is read by the base unit CPU 49 (item 44, FIG. 2) and stored in flash memory 70 as activation status information object, indicating a true or false state. When the SNMP Get Request is received by the base unit 77 the CPU 49 retrieves the current status information stored in flash memory 70 and forms a reply to the service center 33. The service center CPU 34 receives the reply from the base unit 77 and then correlates the activation status information stored in the user profile database 22 with the current state of the user's base unit switch 44 to determine if the user desires delivery (step 401–407, FIG. 4). This process is repeated for each user who participates in the delivery service. In this manner the service center CPU 34 develops a complete list of users who will receive a transmission message during the present delivery period. Once this list is established the control program operating on the CPU resource 34 proceeds to assemble a transmission message, in accordance with the procedure mentioned above, for each user on the list (step 444, FIG. 4). SNMP polling of many user base units 77 can take place in a fraction of one minute. This enables the service center 33 to quickly determine exactly who wants information delivered before expending the resources needed to accomplish the delivery task.

As each transmission message is constructed by the service center CPU 34 it is queued for delivery to the respective user base unit 77. The service center CPU 34 then initiates a TCP/IP session from the service center 33 to the user base unit 77. Once established, the TCP/IP session is used to convey a compiled transmission message from the service center 33 to the base unit 77 (step 450, FIG. 4). Under the control of the CPU resource 49 the base unit 77 verifies the completion of the TCP/IP transmission and stores the received transmission message in flash memory 70. In accordance with TCP protocol, once the transmission message is successfully sent in its entirety to the base unit 77 the base unit sends an acknowledgment to the service center 33 and the TCP/IP session originated by the service center 33 is closed (step 454, FIG. 4). The service center CPU resource 34 then moves on to the next user on the list and repeats the process described above. This process is repeated for each user on the list. In the event that the transmission message cannot be successfully conveyed by the TCP/IP session before a predetermined period of time elapses, the service center CPU resource 34 will discontinue its attempt to deliver the message to the base unit 77 in question and move on to the next user base unit 77 on the list. Since the TCP/IP protocol is flexible and capable of supporting numerous sessions it is intended that many sessions may be established between the service center 33 and a plurality of user base units 77 near simultaneously or simultaneously. The only limiting factor being the extent of the service center CPU resources 34 and, in the preferred embodiment, the bandwidth of the network interface 32 to the network service provider serving the PSTN lines that reach the user base units 77. The delivery period ends when all queued messages have been delivered or unsuccessfully delivered. The service center 33 may try to establish the transmission session again in the event that the transmission message was not successfully received but will cease all attempts after a pre-determined number of attempts have failed within one delivery cycle. The attempts are then recorded as an unsuccessful delivery. When a transmission message is successfully transmitted to the base unit 77 the CPU records the successful delivery via the accounting software 24. The accounting software 24 makes use of the non-volatile storage media 38 to keep a record of successful message deliveries. This information will later be used to generate a periodic bill that will be sent to the user.

The system resources of the service center 33 are sized according to the needs of the user base. During the delivery period CPU processor time may be segmented to perform message compilation simultaneously with message delivery. Therefore the system RAM 28 and storage space on the non-volatile storage media 38 required for queued messages is based on the amount of space needed to handle the logistics of delivering one message to each base unit 77 served by the service center 33 during a fixed time period. The total number of base units 77 will vary depending on the information provided. The system 95 is intended to be flexible, providing a variety of audio information to a group or several different groups. For instance one group may consist of a local church and desire to receive religious information over the service 95 while another group may consist of a local business desiring to deliver messages to its sales force overnight. Both groups can be serviced by the same service center 33 using different scheduled delivery periods for different purposes. Thus the information needs of more than one group can be accommodated by a single service center 33. It is intended that for all groups served by the service center 33 the delivery period is to be a fraction of one 24 hour day. Thus the number of groups and the delivery requirements for each group will dictate the extent of the service center CPU resources 34 and the bandwidth of the network interface 32.

The base unit 77 is designed for use by an individual user; thus, the system 95 contemplates a plurality of base units, each possessed by an individual user for the purpose of receiving a transmission from the service center, interfacing with a user-supplied recording device, and delivering the audio message contained in the transmission to the recording device 80. The base unit is designed to be installed within the subscriber's premises 90 and is, in the preferred embodiment, simply plugged in to the household power supply 75, a user-supplied recording device 80, and an ADSL modem 16. The connections between the base unit 77 and the user-supplied recording device 80 include a power connection to the control interface port 40 and audio signal connections to the output of the stereo codec 45. The signal connections 45 are a set of standard left/right channel audio jacks identical to those normally found on standard stereo equipment. The power connection 40 is a standard power receptacle (40D, FIG. 2) identical to those commonly found in any residence. The receptacle 40D is part of the base unit 77 and the power cord from the user-supplied recording device 80 plugs into it. The user-supplied recording device 80 can be any of the multitude of standard magnetic tape audio recording appliances that are commonly found in consumer households. These appliances may include stereo receivers, stand-alone audio recording devices, and portable stereo systems. The only requirements for the user-supplied recording device 80 is that it must have a built-in audio cassette recorder and be capable of receiving input audio signals from an outside source. The base unit 77 communicates with the service center 33 over the PSTN 14 via an xDSL modem 16. The xDSL modem 16 handles the physical and data link layer functions involved with maintaining an active connection to the data network side of the local network service provider. It does so without interfering with the normal purpose and function of the user's telephone 18. The base unit 77 connects to the ADSL modem 16 through a network interface 42 which, in the first embodiment, is a 10-base-T ethernet connection. The data interface protocol is compliant with the IEEE 802.3 standard protocol. This connection may also be a Universal Serial Bus (USB) port or some other form of industry standard network interface depending on the data interface port of the modem 16. The base unit 77 includes a microcontroller or base-unit CPU 49, as well as EPROM 72, RAM 73, and flash memory 70. The non-volatile memory consists, in the first embodiment, of EPROM 72 which stores the operating code of the base unit 77, and a flash memory 70 which is used to store received transmission messages from the service center 33. The microcontroller or CPU 49 references the control program stored in the EPROM 72 to manage the operation of the base unit 77. An essential part of the operation of the base unit 77 is the output of received transmission messages stored in flash memory 70 to the user-supplied recording device 80. This is done preferably with the help of a decoder chip 46 that is capable of decoding compressed digital audio signals into real-time digital samples. The digital samples are then delivered to a stereo codec 45 which accepts the samples and converts them into realtime analog signals for output on the left/right channel audio jacks connected to the codec 45. The base unit also includes a user switch 44 which can be used by the user to deactivate the base unit 77 and thereby prevent transmissions by the service center 33 of transmission messages to the base unit 77.

The base unit 77 can be selectively activated or deactivated by the user via the user switch 44. As detailed in FIG. 2 when the user switch 44 is in the on position the circuit through the switch is opened allowing power electricity from the base unit's power supply 75 to flow to the contact-side 40B of a normally open relay 40A that is part of the control interface port 40 and connected to the power receptacle 40D of the port 40. The operation of the relay 40A of the control interface port 40 is controlled by the CPU 49. In its normal state the relay 40A of the control interface port 40 is open and does not allow power electricity to flow. This prevents the normal use of any device 80 whose power cord is plugged into the receptacle 40D of the control interface port 40. The CPU 49 activates the relay 40A of the control interface port 40 when the base unit has received a transmission from the service center 33 and is ready to output audio information from the codec 45 as detailed below. The CPU 49 controls the relay 40A of the control interface port 40 by selectively activating or deactivating a specific pinout that is connected to the coil side 40C of the relay. Once the coil 40C of the relay 40A is energized the contact side 40B of the relay closes, causing power electricity to flow from the base unit power supply 75 to the receptacle 40D of the control interface port 40. When the user switch 44 is in the off position the control functionality of the base unit control interface port 40 is deactivated. In this state power electricity is allowed to flow from the base unit's power supply 75, around the contact 40B through the user switch 44, directly to the receptacle 40D of the control interface port 40. This effectively nullifies the action of the control interface port 40 and supplies power directly to any device whose power cord is plugged into the receptacle of the control interface port 40. The user switch 44 is provided as a convenience to the user so that the user will have the option of using the device 80 connected to the control interface port 40 without having to unplug the device from the base unit 77. The user switch 44 also serves the important function of providing status information to the CPU 49 of the base unit 77 as described in the next paragraph.

One of the primary functions of the base unit 77 is to provide feedback information to the service center 33 regarding its status. In the preferred embodiment, status information is limited to the logical representation of the user switch 44 described above. Status information regarding the position of the user switch 44 is constantly monitored by the CPU 49 of the base unit 77. The CPU 49 determines the status of the switch 44 by monitoring one of its interrupt pinouts. As demonstrated in FIG. 2 the pinout in question is connected to a circuit trace that is energized or de-energized depending on the position of the switch 44. The logical voltage level of the circuit trace is read by the CPU and stored in flash memory 70 as an information object. Upon request, this information is read from flash memory 70 and sent to the SNMP management program 50 operating in the service center 33 as detailed below. In this manner the service center 33 can quickly determine the present status of each user base unit 77 that is currently connected to the system 95. Armed with this information, the service center CPU 34 can then allocate service center 33 resources in an efficient manner.

The CPU 49 of the base unit, under the direction of a control program, controls the overall operation of the base unit 77 and coordinates the reception of the service center's 33 transmissions. The CPU's control program is stored on the base unit's EPROM 72. The CPU 49 is used to manage the reception of incoming transmissions, separate compressed audio information from the transmission message protocol format, store the compressed audio information, respond to SNMP queries, control the operation of an external recording device 80, and coordinate the output of audio information to the recording device 80. The CPU 49 is designed to receive two types of messages over the network interface 42. The first type of message is an SNMP query from the SNMP management program 50 located at the service center 33. When an SNMP query is received by the base unit 77 the CPU 49, under the direction of the control program 72, disassembles the SNMP PDU and reads the relevant management instructions. The CPU 49 also checks for specific security information. In particular, the source IP address and the community string of the SNMP message are examined. If the incoming transmission contains a source IP address and community string that correspond with the known service center 33 IP address and system community string, which are stored in the base unit's EPROM 72, then the PDU is processed and a reply is sent back to the service center 33. If the IP address or the community string do not match then the PDU is discarded and no reply is sent. SNMP messages are sent from the service center 33 to each base unit 77 to gather status information about the base unit 77 before the next type of message is assembled and sent. The second type of message sent from the service center 33 to the base unit 77 is a transmission message containing compressed audio information. This type of message is sent via TCP protocol. Typically a TCP session is initiated when the service center 33 sends a Synchronize (SYN) signal to the base unit 77. Before the corresponding TCP Acknowledge (ACK) is sent by the base unit CPU 49, the base unit CPU 49 again checks the source IP address against the address stored in its EPROM to verify that the transmission is from the service center 33. Once the address is verified the CPU 49 establishes the receiving end of a TCP protocol session. Using the methods of TCP protocol, the CPU 49 removes error detection and correction information contained in the transmission PDUs and stores the information payload, consisting of compressed audio information content, onto the base unit's flash memory 70. Once the service center's complete transmission has been successfully received the CPU 49 signals the service center that the transmission is complete via TCP protocol. The service center 33 then terminates the TCP/IP transmission session. The accounting software 24 of the service center 33 then records a successful transmission to the non-volatile storage media 38 via the database program 22. This information will later be used by the accounting program 24 to prepare appropriate billing for the user.

During the TCP session between the service center 33 and the base unit 77, the compressed audio information payload is transferred from the service center 33 to the base unit's flash memory 70. Each incoming TCP PDU is collected, sequenced, and stripped of protocol header information in accordance with TCP protocol. The remaining payload information consists of raw audio samples, preferably compressed according to MPEG 2.5 standards. The compressed audio information is then stored in the base unit's flash memory 70 where it is held until the TCP session is completed. After the TCP session with the service center 33 is complete and the service center 33 terminates the TCP session, the CPU 49 routes the compressed audio information stored in flash memory 70 to the recording device 80. The output signal from the codec 45 is preferably a stereo line-level analog output signal. To output such a signal, the CPU 49 retrieves the compressed audio information from flash memory 70 and sends the information to a decoder chip 46. The decoder 46 processes the compressed input and outputs real-time digital audio samples. The real-time digital audio samples are then fed to a stereo codec 45 which processes the digital samples and outputs a real-time analog output signal. The analog signal is output preferably as a standard left/right stereo line-level signal that can be fed to a recording device 80 having left/right stereo line-level input jacks. As the line-level first analog signal becomes available from the codec 45 the CPU 49 activates the recording device 80 through the control interface port 40. The CPU 49 accomplishes this by energizing the coil of the normally open relay 40C which in turn closes the contact 40B that prevents power electricity from flowing from the base unit power supply 75 to the control interface port 40 and thus to the recording device 80 as mentioned above. Provided that the recording device 80 is properly set up by the user, this action will cause the recording device 80 to activate and record the audio signal to a magnetic audio cassette tape 82. The procedure that is necessary to properly set up the recording device 80 is detailed below.

Figure 3:
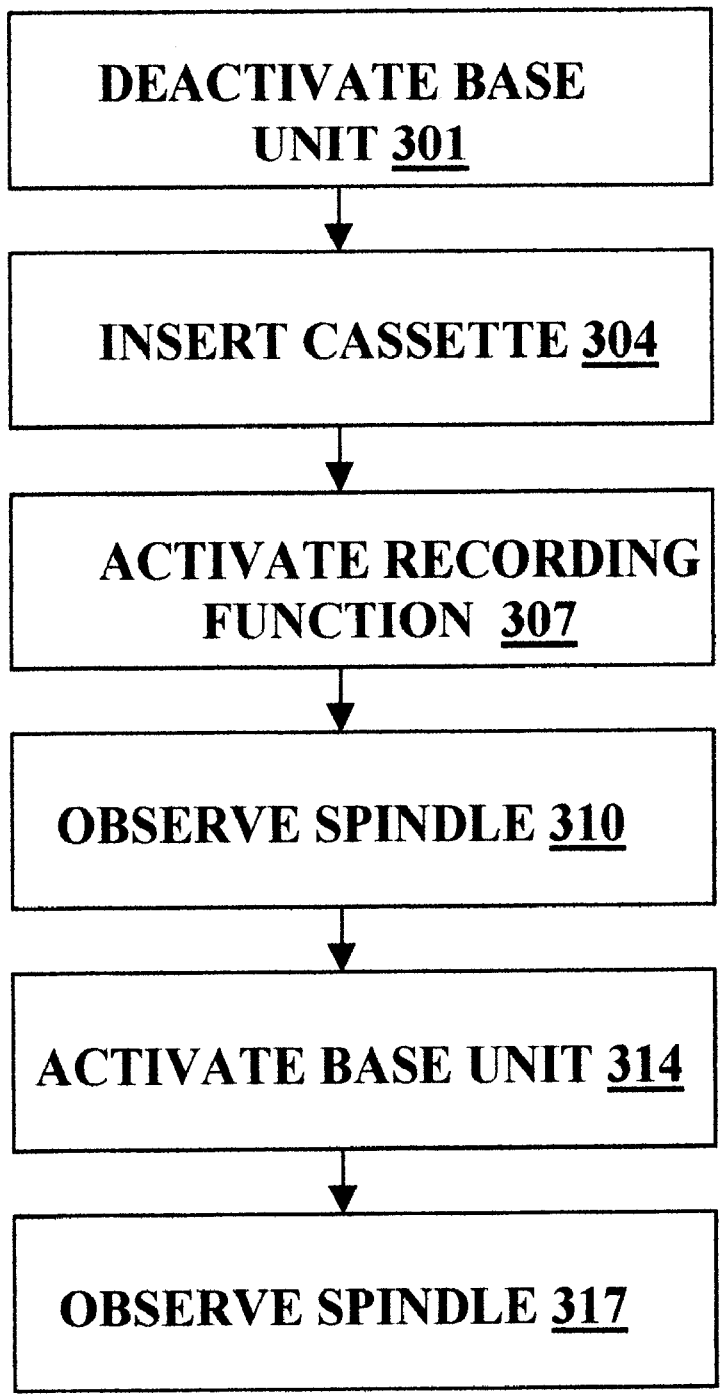
FIG. 3 is a flow diagram detailing the procedure that a user must follow in order for a recording to be made onto a cassette tape from a standard magnetic tape recording device.

The CPU 49 of the base unit manages the flow of digital audio data from the base unit's internal flash memory 70 to the recording device 80, which in the preferred embodiment is a magnetic audio cassette tape recorder. However the CPU 49 cannot, in the preferred embodiment, effectively control the audio cassette tape recorder unless the recorder is set up properly by the user. As detailed in FIG. 3 the user is instructed to take the following steps prior to activating the base unit;

i. deactivate the base unit by flipping the user switch 44 to the off position, step 301.

ii. insert a commonly available audio cassette 82 into the tape deck 80, step 304.

iii. activate the recording functionality of the tape deck 80, step 307. With a typical audio cassette recorder this is done by depressing the play and record buttons of the tape deck simultaneously.

iv. observe the motion of the recording device's 80 spindle mechanism, step 310. This step verifies that power electricity is flowing through the base unit 77 to the recording device 80.

iv. activate the base unit 77, step 314. This is done by flipping the user switch 44 to the on position.

v. verify that the base unit 77 is working, step 317. This is accomplished by observing the spindle mechanism of the recording device 80 stop when the user switch 44 is flipped to the on position.

In order for the above procedure to work it is assumed that the base unit 77 is appropriately connected to the recording device 80 and that the user has taken the time to rewind the audio cassette tape 82. This means that the power cord of the recording device 80 is plugged into the receptacle 40D of the control interface port 40 and the output jacks of the codec 45 are connected to the input jacks of the recording device 80. After the above procedure is followed, and provided that a transmission message has been previously sent from the service center 33 to the base unit 77, the user will possess a new recording of audio information recorded onto a normal audio cassette tape 82. This tape 82 can be replayed at the user's convenience in a car stereo, portable cassette device, or any other magnetic tape audio playback device.

FIG. 4 is a depiction of the preferred distribution method of the present invention. As shown in the drawing the method is broken down into steps performed by the service center 33, encompassed by the bracket numbered 400, and steps performed by the base unit 77, encompassed by the bracket numbered 700. The preferred distribution method provides for the following benefits: 1) maximum use of the real-time capacity resources of the service center 33, 2) maximum utilization of resources owned by the user 90, 3) a lower cost base unit 77, and 4) an easy and convenient way for the user to control when and if audio information is sent from the service center 33 to the user. As described above the method is initiated by the service center 33 in steps 401 and 404 when the service center 33 checks the database 22 for the user's delivery preference. The service center 33 also actively queries 404 the user's base unit 77 by using its network management resources 50 in conjunction with the network interface 32. The results of this query 404 and the database query 401 are used to determine if a user desires to receive audio information during the next delivery period. If the results of these queries indicate that the user does want to receive information then the user's ID is added to the transmission queue 407. This process is repeated for each user until every user profile stored on the database 22 is checked. Steps 401 through 407 summarize the steps that take place prior to the delivery period of the service center 33 cycle and adequately prevent the service center CPU 34 from using valuable resources to assemble transmission messages for users who do not want to receive information. Steps 440 through 454 summarize the delivery period of the normal service center 33 cycle. During the delivery period the transmission queue derived in the preceding steps is retrieved 440 and used to build transmission messages 444. As transmission messages are built the service center 33 initiates contact 447 with corresponding user base units 77 and transmits tailored audio information 450 to each base unit 77. When the information is successfully received the transmission session is closed by the service center 454 and an entry is made by the service center accounting software 24 that signifies information successfully received. Steps 701 through 727 are completed by each user's base unit 77 provided that the base unit 77 received a transmission message during the last delivery period. Basically the stored transmission message is retrieved 701 from flash memory 70, decompressed 704, and output by the codec 45 in step 707. The use of compression is significant in that it allows the base unit 77 to store significantly more audio information in flash memory 70 than would be possible without the use of compression. Therefore much less flash memory 70 is required to store an equivalent amount of audio information when compression is used, resulting in reduced costs for flash memory 70 and subsequently, reduced costs in the base unit 77. Once the decompressed audio signal becomes available to the recording device 80, the recording device 80 is activated 720 by the base unit 77. When the audio information is delivered 724 completely, the recording device 80 is deactivated 727 by the base unit. Thus completing the delivery period of the normal service center 33 cycle.

FIG. 5 depicts a second embodiment that uses a control interface port 40 that is designed to interface with a recording device 80 that has a remote control receiving port 41 built in. This type of recording device is capable of receiving control signals from a remote controller that signal the recording device to activate, deactivate, begin recording, stop recording etc. Instead of using a power relay 40A as described in the best mode, the base unit 77 takes control of the recording device 80 by transmitting infrared or other electromagnetic waves. The electromagnetic wave transmitted by the base unit 77 conforms to the electromagnetic wave normally produced by the remote controller of the recording device 80. In this embodiment the base unit contains a set of pre-defined electromagnetic wave profiles designed to communicate with the recording device 80 through its remote control receiving port 41. At setup the user trains the base unit to send the appropriate signal in similar fashion to the way popular television "universal" remote controllers are programmed at setup. Once configured, the electromagnetic control signals sent from the base unit 77 to the recording device 80 can be used to start recording, stop recording, rewind the cassette etc. The control interface port 40 of this embodiment preferably does not consist of a power relay 40A under control of the base unit CPU 49. The control interface port 40 consists of a built-in electromagnetic transmitter capable of duplicating the control signals normally transmitted by the remote controller of the recording device 80. For instances where the remote controller of the recording device 80 does not function to activate and deactivate the recording device 80, the control interface port 40 may consist of a combination of power relay 40A as detailed in the best mode and an electromagnetic transmitter to enable the control interface port 40 to activate the recording device 80, deactivate the device, start the recording process, and stop the recording process. This embodiment is intended to provide a more thorough control alternative to those users who have recording devices 80 that make use of an electromagnetic remote controller.

FIG. 6 depicts a third embodiment of the invention designed for people who have access to or own a personal computer (PC) 10 and can access the data network connected to the service center 33. Storage and decompression of transmission messages sent from the service center 33 are not done by the base unit 77 in this embodiment. These functions are completed on the host personal computer 10 by specialized software that is installed by the user for this purpose. To remove unnecessary cost from the base unit 77 that embodies this form of the invention, the flash memory 70 and decoder chip 46 are removed. The data network interface 42 is replaced by a serial port 43 that functions to transfer real-time digital audio samples from the PC's serial port 12 to the base unit 77. The serial port 43 may also be a universal serial bus interface, a parallel port interface, or other type of data interface that effectively receives and transmits data between the base unit 77 and the user's personal computer 10. Direct communication with the data network built upon the communications platform 14 is no longer done by the base unit 77 itself but by the personal computer 10 in conjunction with a modem 16 such as an xDSL or cable modem. The service center 33 does not initiate contact with the base unit 77 to deliver transmission messages. Instead the base unit 77 waits for the user to activate the personal computer 10. Once the personal computer is activated, the base unit 77 signals the SNMP agent on the PC 10, installed as part of the software mentioned above, to send a trap to the service center 33 indicating that the base unit 77 is available to receive a transmission message. When the service center 33 receives the trap it diverts some of its resources to assemble a transmission message. The transmission message is then sent to the PC 10 where it is decompressed and stored using the personal computer's 10 resources. Real-time digital audio samples are then output on the PC serial port 12 and received by the base unit 77 on the base unit's serial port 43. The base unit CPU 49 then activates the recording device 80 via the control interface port 40 and routes the samples to the stereo codec 45 where they are transformed to analog audio signals and output to the recording device 80. Once the transmission message is successfully received by the personal computer the service center accounting unit 24 records the download as a successful transmission. The entire process described above takes place in the background on the user's PC 10 and does not require the user's interaction other than to set the user switch 44 on the base unit 77 and to open a session on the PC 10 to the user's ISP or Internet provider such that the xDSL modem 16 is enabled and open to carry data traffic.

FIG. 7 is an example of another embodiment of the invention. In this embodiment, a standard recording device 80 is built into the base unit 77 to accommodate those users who do not own a standard recording device that can accept an audio input signal. The control of the recording device 80 is still accomplished by controlling power electricity through a power relay. When the base unit CPU 49 has received a transmission message from the service center 33 the base unit 77 activates the recording device 80 and delivers the audio message to the recording device 80 as detailed above. However, in this embodiment, the connections between the recording device 80, codec 45, and control interface port 40 are direct electrical connections. There is no need for a receptacle 40D or stereo left/right output jacks on the codec 45. This will enable the user to make recordings on standard audio recording media such as a magnetic audio cassette tape 82 without the need for a recording device with input signal capability.

While the invention has been described in terms of selected preferred embodiments, it is to be understood that the invention is not limited only to those embodiments. Rather, many modifications and variations will present themselves to those skilled in the art without departure from the scope and spirit of the invention, as defined in the appended claims.

What is claimed is:

1. A system for economical distribution of audio information to subscribers, that stores compressed digital audio information at a central library of a service center, retains said information for dissemination to a large number of subscribers, establishes communications with subscriber base units, delivers said audio information to said subscriber base units, wherein the base units each convert said audio information for output, interface with audio player devices capable of recording, and automatically transfers to said audio player devices the audio information, wherein (a) the service center includes:
   a user interface permitting the users to input respective user preferences about topics of interest and preferences about delivery;
   a means of processing functioning to coordinate the activities of said service center;
   said library of compressed digital audio information;
   non-volatile storage media functioning to store said user preference information and said audio information;
   means of network management functioning to gather status information from subscriber base units and to record said status information on said storage media; and
   a network interface functioning to connect said service center with a communications platform for the purpose of communicating with one or more base units;

(b) each said base unit includes:
   network interface means for communicating with said service center network interface over a communications platform, and for receiving and transmitting data transmissions between said service center and said base unit;
   microprocessor means, electronically interconnected to said network interface, for controlling the overall operation of said base unit including the receipt and storage of audio information transmitted to said base unit from said service center;
   non-volatile, read-only memory, electronically interconnected to said microprocessor means, storing instructions that are executable by said microprocessor means;
   a control program, stored in said non-volatile, read-only memory, functioning to contain said executable instructions;
   feedback means, contained as a specialized set of instructions in said control program, functioning to provide information, in the form of a data network message, to said service center network management means pertaining to status information identified and stored in said base unit;
   non-volatile digital memory storage means functioning to store digital audio information transmitted to the base unit from the service center;
   decompression means, electronically interconnected to said microprocessor means, functioning to accept compressed digital audio data and to convert said data into real-time digital audio data;
   conversion means for converting said real-time digital audio data to a format suitable for output to an audio player device;
   control interface means, electronically interconnected to and controlled by said microprocessor means, functioning to control an audio player device;
   a user switch having first and second conditions, electronically interconnected to said microprocessor means, wherein a feedback message generated by said microprocessor means depends on the condition of said switch; and also permitting the subscriber to activate or deactivate said base unit depending on the respective condition of the switch; and c) an audio player device including:
   input means for accepting said audio information; and
   means for recording said audio information.

2. A system according to claim 1 wherein said control interface means includes a power relay, electrically interconnected to a power receptacle located on the base unit, functioning to control the flow of power electricity to said receptacle under the direction of said microprocessor means.

3. A system according to claim 1 wherein said audio player device is a standard magnetic tape audio cassette player.

4. A system according to claim 1 wherein said control interface means includes an electromagnetic wave transmitter device, electronically interconnected to said microprocessor means, functioning to transmit electromagnetic wave control signals from said base unit to said audio player device.

5. A system according to claim 1 wherein said audio player device is an optical recording device.

6. A system according to claim 1 where said audio player device plugs into a receptacle located on said base unit.

7. A system according to claim 1 wherein said decompression means includes a decoder semiconductor chip and said conversion means includes a stereo codec semiconductor chip, electronically interconnected to said microprocessor means, functioning to decode compressed, digital audio data to real-time digital audio data and to convert said real-time data to a form that is suitable for recording, respectively.

8. A system according to claim 1 wherein said base unit microprocessor means is a digital signal processor semiconductor chip; and wherein said decompression means includes a set of specialized instructions, residing on said non-volatile digital memory storage means, functioning to provide said digital signal processor semiconductor chip with instructions for implementing decompression of compressed, digital audio samples.

9. A system according to claim 1 wherein the base unit non-volatile digital memory storage means is implemented as hard drive space on a personal computer separate from said base unit.

10. A system according to claim 9 wherein said decompression and conversion means include a specialized set of instructions, existing as software stored on said personal computer, functioning to decompress compressed, digital audio samples and to convert said samples to a form suitable for recording in said player device.

11. A system according to claim 10 wherein said base unit feedback means is an SNMP agent, existing as software installed on said personal computer, functioning to provide feedback information to said service center network management means.

12. A system according to claim 11 wherein said base unit network interface includes a standard personal computer input/output interface functioning to provide a means of communication between said base unit and said personal computer.

13. A system according to claim 1 wherein said audio player device includes a recording mechanism integral with said base unit.

14. A method by which a base unit receives audio information in compressed form and transfers the information to a controlled audio player device where it is recorded on a storage medium in a form that is easily transportable and in which the audio information can later be played back for a user; comprising the steps of ensuring that the audio player device and the recording medium are properly conditioned to receive audio information;

awaiting reception by the base unit of a message specifically intended for said user and containing the audio information in compressed form;

automatically receiving the message over a transmission link;

activating the controlled device; and transferring the audio information contained in said message to said controlled audio player device including the step of automatically actuating the controlled device to record said audio information therein.

15. The method of claim 14 wherein said controlled device is an audio cassette recorder, and said step of transferring the audio information to the controlled device includes automatically switching on power electricity to said controlled device to commence recording of the audio information onto said cassette.

16. The method of claim 15 wherein said step of automatically actuating the controlled device is performed by transmitting a set of electromagnetic wave signals from said base unit to said audio player device.

17. The method of claim 15 wherein said step of automatically actuating the controlled device is carried out by sending an electric signal over a direct electrical connection from said base unit to said audio player device.

18. Method of delivering subscriber-specific recorded audio information from a central library associated with a service center to a multiplicity of subscribers in a manner that maximizes efficient use of system and subscriber resources used to discharge an operations workload associated with a periodic delivery cycle, the periodic delivery cycle comprising:

storing at said service center user profiles to include categories of interest identified by the respective subscribers and delivery preferences of the respective subscribers;

effecting data connections between said service center and a base unit for each said subscriber over a data link capable of transmitting audio files in compressed digital form to the respective subscriber base units;

obtaining feedback messages from the entire multiplicity of subscribers identifying which of said subscriber base units have indicated their readiness to receive a transmission from the service center;

building, for each said subscriber so identified as ready, a set of compressed audio files according to the category or categories of interest in the respective user profile for the subscriber;

connecting said service center with the subscriber base station for each said subscriber so identified over said data link;

transmitting to each said subscriber base unit respectively a message containing the respective set of compressed audio files over said data link; said base station receiving and storing the set of audio files in compressed digital form; and automatically transferring said audio files from the respective base station to an audio player device in a form permitting the subscriber to play back, at a user-determined time thereafter, the selected audio information;

wherein the step of transmitting includes accounting of completed transmissions to create a record of successful message deliveries.

19. A method according to claim 18 wherein for each said subscriber identified as not ready, said service center performing none of the functions necessary to build a set of compressed audio files and omitting any transmission of compressed audio files to the associated base unit, thereby conserving service center resources including communications resources.

20. A method according to claim 18, wherein said multiplicity of subscriber base units each include a simple hardware interface in the form of a two-position switch that can be actuated by the respective subscriber in the time span of a few seconds to manage the dissemination of information from the service center to the respective subscriber's base unit.

* * * * *